Dec. 25, 1934.                R. BACCELLIERI                1,985,275
                               NOODLE MACHINE
                     Filed Oct. 25, 1933      3 Sheets—Sheet 1

WITNESSES:

INVENTOR
Ralph Baccellieri.
BY
HIS ATTORNEY

Dec. 25, 1934.   R. BACCELLIERI   1,985,275
NOODLE MACHINE
Filed Oct. 25, 1933    3 Sheets-Sheet 2

WITNESSES:
O. H. Cook.
Evelyn Baitzel

INVENTOR
Ralph Baccellieri
BY
Joshua R. Potts
HIS ATTORNEY

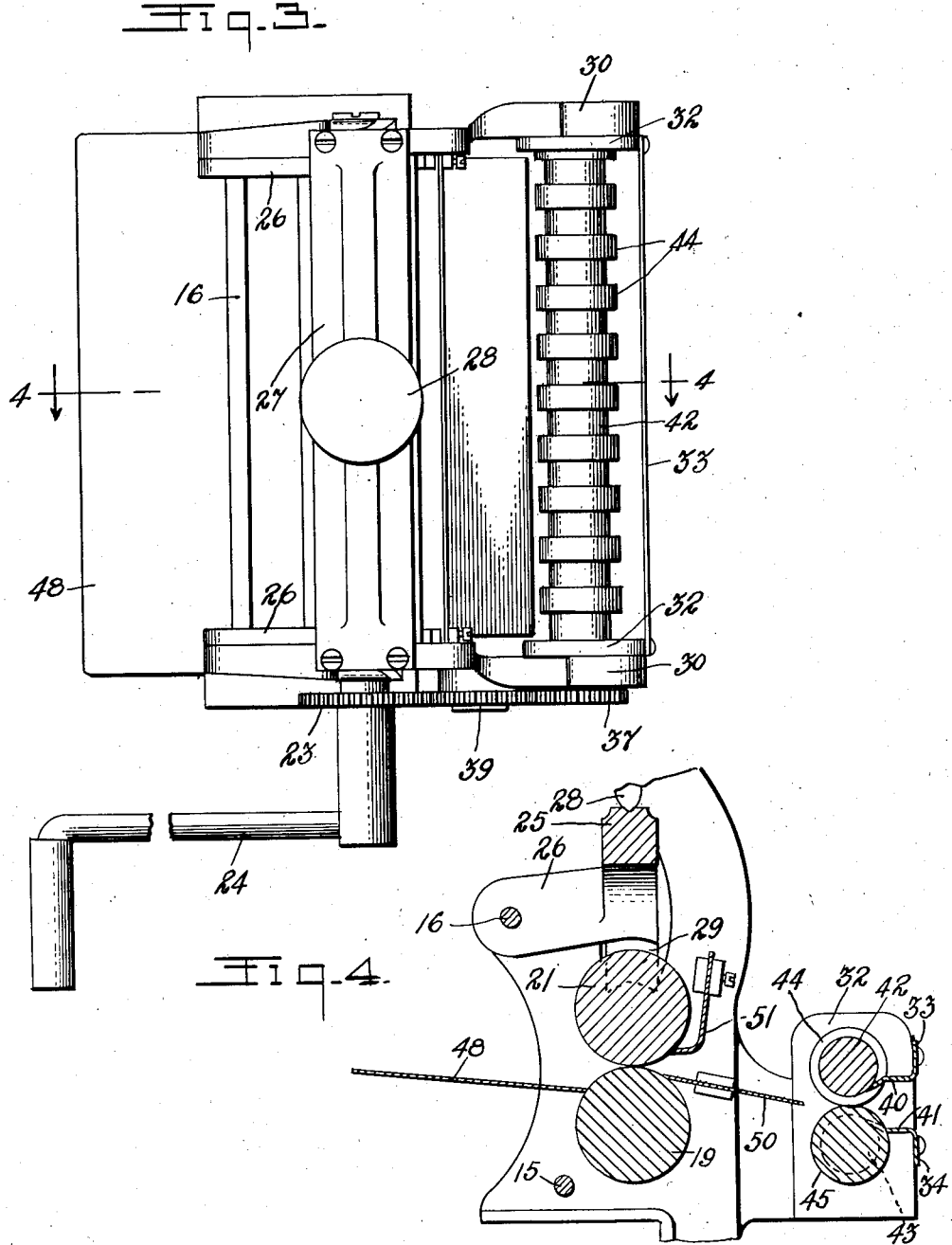

Patented Dec. 25, 1934

1,985,275

UNITED STATES PATENT OFFICE 1,985,275

NOODLE MACHINE

Ralph Baccellieri, Philadelphia, Pa.

Application October 25, 1933, Serial No. 695,103

2 Claims. (Cl. 107—22)

This invention relates to noodle machines and has for an object to provide a machine which will in a new manner employ a lump of dough, converting it first to a thin sheet and then in an improved manner slitting the sheet to produce ribbons of dough of any required width and indeterminate length.

A further object of the invention is to provide improved means for associating the rollers with the frame, whereby the dough is rolled to a thin sheet and permitting the ready removal of one of the rollers for cleaning purposes.

A further object of the invention is to provide a shearing unit which may be removed and replaced by a shearing unit embodying means for shearing the sheet of dough to different widths.

A further object of the invention is to provide improved mounting for the shearing unit.

The invention, therefore, comprises a frame which is provided with a pair of rollers properly positioned and adjustable for the application of power and for adjustment for varying the thickness of a sheet of dough passing therebetween with means for carrying the sheet of dough so formed between shearing rollers which are actuated from the same source as the pressing rollers, which said shearing rollers are mounted as a unit readily removable from the frame for replacement by shearing rollers of different gauge, and with means for ready removal of one of the pressing rollers for cleansing or other purposes.

The drawings illustrate an embodiment of the invention and the views therein are as follows:—

Figure 4 is a sectional view taken on line 4—4 of Figure 3 with the top structure broken away, Figure 5 is a view in elevation of the shearing unit, Figure 6 is a fragmentary view of the frame showing the bearings and mounting for the shearing unit rollers.

Like characters of reference indicate corresponding parts throughout the several views.

Figure 1:
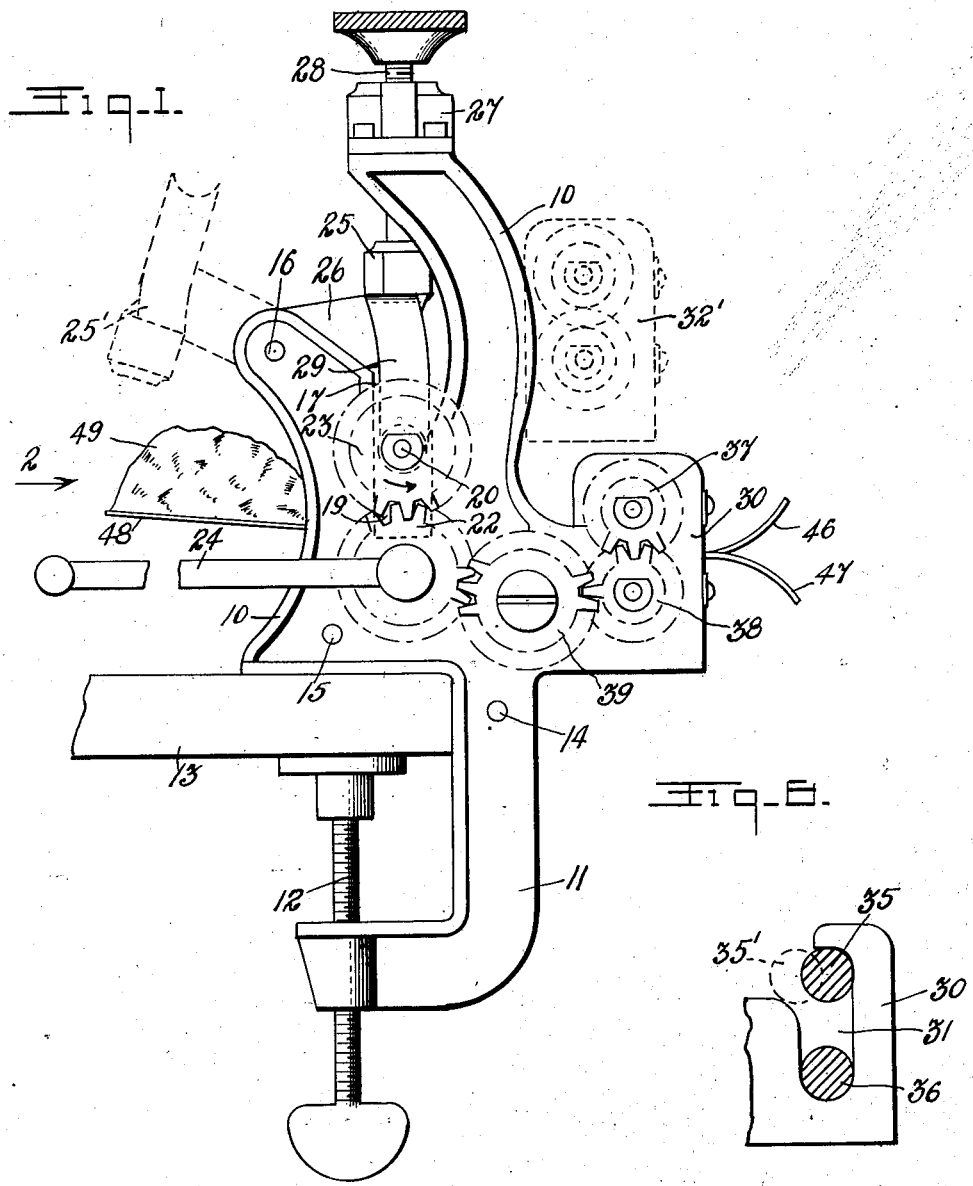
Figure 1 is a view of the improved machine in side elevation.
Figure 2:
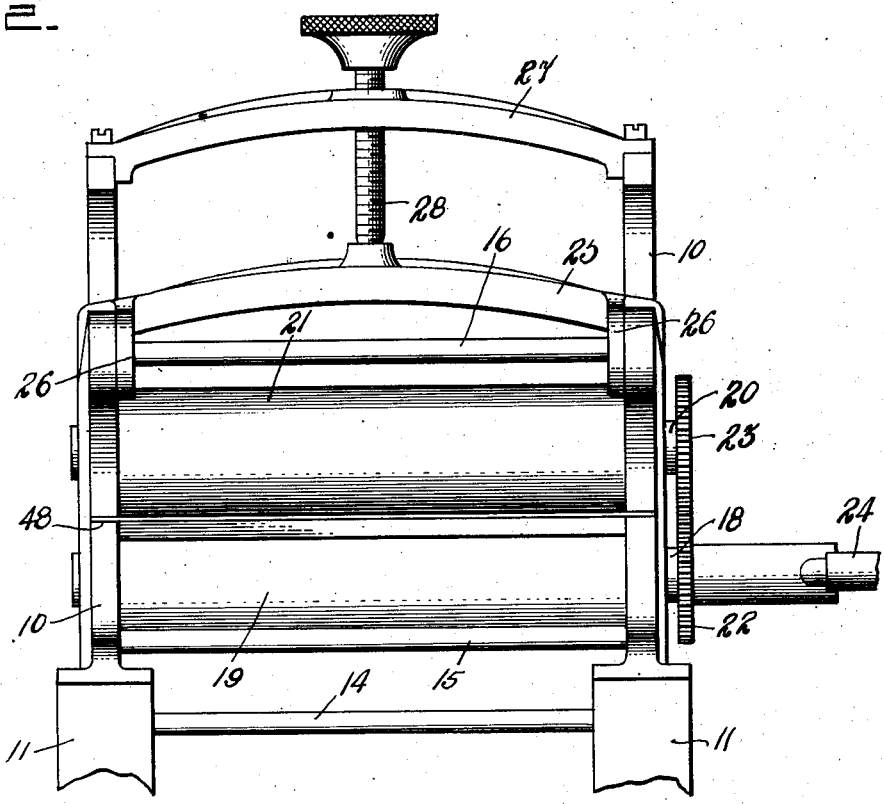
Figure 2 is a view of the machine in front elevation, as indicated by arrow 2 at Figure 1.

The improved noodle making machine which forms the subject-matter of this application comprises a frame 10 having means as a bracket 11 and thumb screw 12 for attaching to a table or like device indicated at 13, it being understood, however, that this is merely illustrative and that any other manner of attaching the framework to a body may be employed. The frame comprises two side members which are interconnected by means of rods 14, 15 and 16, or in any other approved manner.

Each side of the frame is provided with a slot 17, and journaled in alignment with the slot is a shaft 18 which carries the roller 19. Mounted in the slot above the shaft 18 is another shaft 20 provided with a roller 21 which normally bears upon the roller 19 and may be separated therefrom by the introduction of material therebetween, the roller 21 lifting to compensate for such introduced material. Gears 22 and 23 carried respectively by the shafts 18 and 20 intergear, so that both of said rollers rotate simultaneously. Power is applied to one of these rollers, preferably to the roller 18, and a crank 24 is shown merely as illustrating any approved means for applying power.

For exerting pressure upon the upper roller 21, a frame 25 having arms 26 is pivoted to the cross bar 16 to swing from full line position, as shown at Figure 1, to the dotted line shown at 25' in said figure.

A top bar 27 overlies the normal or full line position of the frame 25, and a thumb screw 28 is provided for exerting pressure upon the frame 25 which through the downwardly extending parts 29 bear upon the shaft 20, so that the adjustment of the thumb screw 28 varies the pressure upon the roller 21.

The frame is extended to form a hook 30 which defines a slot 31, see Figure 6. For co-operation with this hook 30 and slot 31 a shearing unit is provided which is shown in front elevation at Figure 5 and in cross-section at Figure 4. This comprises spaced cheek plates 32, which are rigidly secured together by means of bars 33 and 34.

Figure 3:
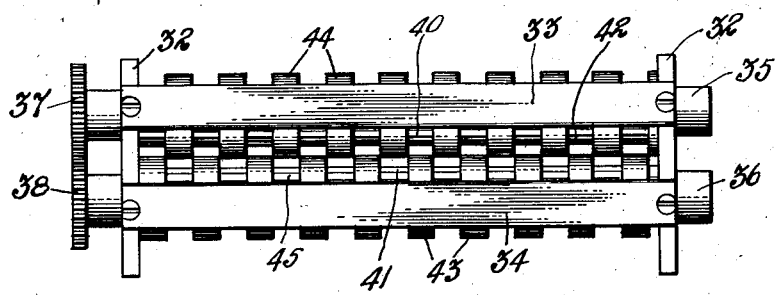
Figure 3 is a top plan view of the machine.

The cheek plates 32 serve to journal shafts 35 and 36, which are provided respectively with gears 37 and 38 which are intergeared as shown at Figure 1, and the gear 38 is intergeared with an idler gear 39, which in turn is intergeared with the gear 22, so that as the gear 22 is rotated by means of the power applied, all of said gears will rotate in the directions indicated by their respective arrows at Figure 1. The bar 33 carries fingers 40 and the bar 34 carries fingers 41, said fingers serving as strippers for the shearing rollers 42 and 43, which are carried upon the shafts 35 and 36 respectively. These shearing rollers, as will be noted more particularly from Figures 3 and 5, comprise spaced disks 44 and 45 of equal width and which interlie each other, as shown more particularly at Figure 5, whereby when the shafts 35 and 36 are rotated carrying therewith the disks 44 and 45, the sheet of material passing between said shearing rollers will be severed into strips corresponding in width to the width of the disks, and by reason of their curvature such ribbons will take the form indicated at 46 and 47 in Figure 1.

The device is also provided with a table or deck 48 upon which may be placed a lump of dough indicated at 49, which will pass between the rollers and onto the deck 50 as a thin sheet. To insure the proper stripping of this sheet from the rollers, the deck 50 acts as a stripper upon the roller 19 and a stripper 51 is provided for operating upon the roller 21, as indicated at Figure 4. It will, therefore, be apparent that when the dough is fed to the bite of the rollers 19 and 21, it will be by such rollers drawn through in a sheet regulated as to thickness by the adjustment of the thumb screw 28, and will pass therefrom across the deck 50 and between the shearing rollers 42 and 43, and be thereby sheared into narrow ribbons corresponding to the width of the disks 44 and 45.

As it is desirable to make noodles of different width, the shearing unit is provided so that it may be readily removed and replaced by another unit differing in the thickness of the disks 44 and 45, whereby ribbons of dough either narrow or wider than that indicated by the thickness of the disk shown, may be produced.

To provide for the ready change from one width of noodle to another, the shearing unit is made up, as shown at Figure 5, and the shafts 35 and 36 slip into the slot 37 in the manner indicated at Figure 6, that is to say, it is first inserted angularly as indicated in dotted lines at 35'. The stress of rotation applied thereto by the rotation of the several gears in the directions indicated serves to move and hold this unit in full line position as shown at such Figure 6, but permits the unit to be removed merely by canting it as an entirety to the dotted line position and slipping it out of the slot 31. The change is indicated at 32' in Figure 1, the units being lifted to dotted line position which is clear of the journaling slot. This removal also provides, of course for the ready and convenient cleansing of the shearing rollers.

Of course, the noodle making machine herein illustrated may be modified and changed in various ways without departing from the invention herein set forth and hereinafter claimed.

I claim:—

1. A noodle making machine comprising a frame having a slot, a roller journaled in the frame, a bar mounted to swing upon the frame, a roller carried by the frame in co-operative relation with the journaled roller, means for employing the bar for adjusting the bite of the two rollers, a unit including a pair of rollers spaced from the first and second-mentioned roller, said pair of rollers comprising a plurality of interacting disks arranged in shearing relation and tiltingly mounted in the slot, and common means for driving all of said rollers simultaneously, said means tending to tilt the unit to operative position.

2. In a noodle making machine, a frame, a pair of pressing rollers mounted to rotate in the frame, said frame embodying a hook defining a slot, a shearing unit comprising a pair of cheek plates, a pair of shafts journaled in the cheek plates, said shafts carrying rollers each comprising a plurality of disks, the width of the disks of one roller being equal to the interval between the disks of the coacting roller, said cheek plate and roller being properly proportioned to provide for the insertion of the shafts into the slot provided by the hook.

RALPH BACCELLIERI.